(12) United States Patent
Johnson et al.

(10) Patent No.: US 6,437,935 B1
(45) Date of Patent: *Aug. 20, 2002

(54) METHOD AND APPARATUS FOR A REAL AND POSITIONAL OPTIMIZATION OF A STORAGE DISK DATA ZONE

(75) Inventors: Douglas Wayne Johnson; Todd Phillip Fracek, both of Rochester; Jeffrey Fred Boigenzahn, Pine Island, all of MN (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/340,546

(22) Filed: Nov. 16, 1994

(51) Int. Cl.[7] .............................. G11B 21/02; G11B 5/55
(52) U.S. Cl. ................... 360/75; 360/78.04; 360/78.08; 360/77.02
(58) Field of Search ....................... 360/105, 75, 77.02, 360/15, 77.08, 78.04, 78.08; 369/32, 47, 50, 54, 275.3, 275.4

(56) References Cited

U.S. PATENT DOCUMENTS

| 4,599,659 A | * | 7/1986 | Saito ........................ 360/75 |
| 4,656,538 A | * | 4/1987 | Mattson ................ 360/77.08 |
| 4,703,371 A | | 10/1987 | Redmond et al. ............. 360/75 |
| 4,771,346 A | * | 9/1988 | Shoji et al. ................ 360/15 |
| 4,831,470 A | | 5/1989 | Brunnett et al. ............. 360/75 |
| 4,980,783 A | | 12/1990 | Moir et al. ............... 360/77.02 |
| 5,208,712 A | | 5/1993 | Match et al. ............. 360/98.01 |
| 5,241,438 A | | 8/1993 | Matsushima ................ 360/105 |
| 5,377,065 A | * | 12/1994 | Morehouse et al. ........ 360/105 |

FOREIGN PATENT DOCUMENTS

| EP | 0451935 A1 | 10/1991 | ............ G11B/5/54 |
| EP | 0480578 A1 | 4/1992 | ............ G11B/5/54 |
| GB | 2230129 A | 10/1990 | ............ G11B/21/12 |
| JP | 3-154272 | 7/1991 | |
| JP | 4-30376 | 2/1992 | |
| JP | 04-117678 | 4/1992 | ............ G11B/21/12 |
| JP | 4-289568 | 10/1992 | |
| JP | 4-337577 | 11/1992 | |
| JP | 4-349279 | 12/1992 | |
| JP | 05-266620 | 10/1993 | ............ G11B/21/16 |
| JP | 05-303842 | 11/1993 | ............ G11B/21/02 |

* cited by examiner

*Primary Examiner*—Andrew L. Sniezek
(74) *Attorney, Agent, or Firm*—Mark A. Hollingsworth

(57) ABSTRACT

A data zone optimization method and architecture for optimizing the location of the data zone on a data storage disk is disclosed. The data zone is preferably biased toward the outer diameter of the disk, and is referenced to a data zone starting location established proximate a load/unload ramp apparatus. An optimum starting location for the data zone of an initially unformatted data storage disk is preferably determined by contacting the load/unload ramp with the transducer assembly, disengaging the transducer assembly from the ramp, and writing servo information indicative of the data zone starting location at a disk location proximate the ramp and transducer assembly contact point. Servo information indicative of the data zone is written at inner diameter disk location with respect to the optimum data zone starting location. The optimized data zone architecture may have a predetermined or variable data storage capacity.

21 Claims, 7 Drawing Sheets

METHOD AND APPARATUS FOR A REAL AND POSITIONAL OPTIMIZATION OF A STORAGE DISK DATA ZONE

FIELD OF THE INVENTION

The present invention relates generally to data storage systems, and more particularly, to a method and architecture for optimizing the data zone on data storage disks employed in load/unload data storage systems.

BACKGROUND OF THE INVENTION

A typical data storage system includes one or more data storage disks coaxially mounted on a hub of a spindle motor. The spindle motor rotates the disks at speeds typically on the order of several thousand revolutions-per-minute. Digital information, representing various types of data, is typically written to and read from the data storage disks by one or more transducers, or read/write heads, which are mounted to an actuator and passed over the surface of the rapidly rotating disks.

The actuator typically includes a plurality of outwardly extending arms with one or more transducers being mounted resiliently or rigidly on the extreme end of the arms. The actuator arms are interleaved into and out of the stack of rotating disks, typically by means of a coil assembly mounted to the actuator. The coil assembly generally interacts with a permanent magnet structure, and the application of current to the coil in one polarity causes the actuator arms and transducers to shift in one direction, while current of the opposite polarity shifts the actuator arms and transducers in an opposite direction.

In a typical digital data storage system, digital data is stored in the form of magnetic transitions on a series of concentric, closely spaced tracks comprising the surface of the magnetizable rigid data storage disks. The tracks are generally divided into a plurality of sectors, with each sector comprising a number of information fields. One of the information fields is typically designated for storing data, while other fields contain sector identification and synchronization information, for example. Data is transferred to, and retrieved from, specified track and sector locations by the transducers being shifted from track to track, typically under the control of a controller. The transducer assembly typically includes a read element and a write element. Other transducer assembly configurations incorporate a single transducer element used to write data to the disks and read data from the disks.

Writing data to a data storage disk generally involves passing a current through the write element of the transducer assembly to produce magnetic lines of flux which magnetize a specific location of the disk surface. Reading data from a specified disk location is typically accomplished by a read element of the transducer assembly sensing the magnetic field or flux lines emanating from the magnetized locations of the disk. As the read element passes over the rotating disk surface, the interaction between the read element and the magnetized locations on the disk surface results in the production of electrical pulses in the read element. The electrical pulses correspond to transitions in the magnetic field.

Conventional data storage systems generally employ a closed-loop servo control system for accurately and rapidly positioning the actuator and read/write transducers to specified data storage locations on the data storage disk. A servo writing procedure is typically employed to record servo information on the surface of one or more data storage disks comprising the data storage system during the manufacture of the data storage system. In accordance with a known servo information format, termed an embedded servo, servo information is written between the data storing sectors of each track. The servo data is thus embedded in the data storing tracks on each of the data storage disks, typically resulting in an alternating sequence of data and servo sectors comprising each track. In accordance with another known servo information format employed in data storage systems, termed a dedicated servo, the servo writer records servo information typically on only one of the data storage disks comprising the disk stack, and often on only one of the surfaces of the dedicated servo disk. The servo information stored on the dedicated servo disk is used to maintain accurate positioning and alignment of the read/write transducers associated with each of the data storage disks. During normal data storage system operation, a servo transducer, generally mounted proximate the read/write transducers, is typically employed to read the servo sector data for the purpose of locating specified track and data sector locations on the disk. It is noted that a servo sector typically contains a pattern of data bits, often termed a servo burst pattern, used to maintain optimum alignment of the read/write transducers over the centerline of a track when reading and writing data to specified data sectors on the track.

Turning now to FIG. 3, there is shown a prior art data storage disk 24 formatted in a conventional manner to include a data zone 73 biased toward, and registered with respect to, the inner diameter of the data storage disk 24. A traditional procedure for writing servo information to a data storage disk 24 includes establishing a data zone starting location 66 typically located near the central disk aperture 71. The innermost data track 64 of a conventional data storage disk 24 is generally situated proximate the clamp engagement surface 62 provided along the circumference of the central disk aperture 71. It is noted that the clamp engagement surface 62 represents a portion of the disk 24 surface area dedicated for clamping or mounting the disk 24 to the hub of a spindle motor (not shown) similar to a spindle motor 26 shown in FIG. 1. It is further noted that axial and radial clamping forces imparted to the disk 24 surface generally result in a high concentration of stress localized along the inner diameter of the disk 24, often resulting in some degree of disk surface distortion or curvature. Accordingly, the innermost data track 64 is generally spaced a short distance apart from the clamp engagement surface 62 to ensure a minimum level of data storage and data transfer reliability.

Having established a data zone starting location 66 and an innermost data track 64, often referred to as track zero, servo information is then transferred to the other disk locations to form a plurality of concentric data tracks 50 as shown in FIG. 1, defining the data zone 73. For example, after writing servo information to define the innermost data track 64, the servo writing transducer is moved a short distance away from the innermost data track 64 in a direction toward the outer periphery 67 of the data storage disk 24. A second concentric data track is then formatted on the disk 24, thereby leaving a narrow gap between the innermost data track 64 and the newly formatted data track. Formatting in this manner generally proceeds until an outermost data track 68 is defined. A data zone ending location 70 is generally defined to be the last data storage or servo sector location on the outermost data track 68.

In load/unload data storage systems, a load/unload ramp 60 is typically employed to engage a read/write transducer 27 assembly near the outer perimeter of the data storage disk 24 during periods in which the data storage system 20 is not in use. The transducer 27 is typically mounted to a slider body 63 to which a load tang 65 is affixed. During the power-down sequence of a load/unload data storage system 20 as shown in FIG. 1, the transducer 27 and slider body 63 assembly is lifted away from the surface of the data storage disk 24 by engagement between the load tang 65 and a load/unload ramp 60. It is generally understood that prolonged direct contact between the slider body 63 and the disk surface 24 results in an increase in static friction, commonly referred to as stiction, between the slider body 63 and disk surface 24. A high level of stiction between the slider body 63 and disk surface 24 is generally associated with excessive wear of the disk surface 24, and increased start-up current consumed by the spindle motor 26 to overcome the additional static friction. Unloading the transducer 27 and slider body 63 assembly from the disk surface 24 to the ramp 60 also reduces potential damage associated with short duration shock forces and other external forces imparted to the housing, (seen as housing 21 in FIG. 2), that, in turn, are transmitted to the sensitive components of the data storage system 20.

During the power-up sequence of the data storage system 20, the transducer 27 and slider body 63 assembly is loaded from the ramp 60 to the disk surface 24. As the rate of rotation of the spindle motor 26 increases, the airflow above the surface of the disk 24 results in the creation of an airbearing upon which the aerodynamic slider body 63 is supported, thus causing the transducer 27 and slider body 63 to rise a short distance above the disk surface 24. To facilitate unloading and loading of the transducer 27 and slider body 63 assembly to and from the ramp 60, a buffer region 72 is generally provided near the outer periphery 67 of the data storage disk 24. It is noted that the buffer region 72 of a conventional data storage disk 24 typically encompasses an appreciable amount of disk surface area that can otherwise be allocated for storing data.

Referring now to FIG. 4, there is shown a typical buffer region 72 of a conventional data storage disk 24. Among the various factors that influence the size of the buffer region 72, the mechanical tolerances associated with the fabrication of various data storage system components and the positioning of these components within the data storage system housing 21 during assembly are generally of particular concern. Each component typically has associated with it a maximum allowable tolerance with respect to the dimensions of the component and the positioning and orientation of the component within the data storage system housing 21. The buffer region 72 typically comprises an appreciable amount of disk surface area in order to accommodate the cumulative maximum or worst case tolerances of the components associated with unloading and loading the transducer 27 and slider body 63 assembly to and from the ramp 60.

Still referring to FIG. 4, there is shown a number of tolerance bands that contribute to the size of the buffer region 72 of a conventional data storage disk 24. Although the tolerance bands are presented merely for illustrative-purposes, the depiction in FIG. 4 demonstrates the aggregate effect of individual component fabrication and installation tolerances on the size of the buffer region 72. It is generally understood that in the design and manufacture of low cost, high volume data storage systems 20, it is common practice to allocate a buffer region 72 having a standard size for a family of data storage disks 24 and data storage systems 20. Although this standardization of the buffer region 72 across a family of disks 24 and systems 20 may advantageously simplify the manufacturing process, such standardization typically results in the allocation of an excessively large buffer region 72 for a particular data storage disk 24 and system 20, thereby reducing the disk surface area otherwise available for storing data, and the overall storage capacity of a data storage system 20.

Each of the tolerance bands comprising the buffer region 72 is representative of a portion of the disk 24 surface area required to accommodate the maximum or worst case manufacturing and assembly tolerance variations associated with a particular component of a data storage system 20. Tolerance band 74, for example, is illustrated as being representative of the outer diameter disk 24 surface area required to accommodate the maximum tolerance variations in the height and vertical positioning of the ramp 60 with respect to the substantially planar surface of the data storage disk 24. Manufacturing variations associated with the slope or incline of the ramp 60 are accommodated by an additional tolerance band 76. Further, variations in the mounting position of the ramp 60 on the housing base 22 are accommodated by another tolerance band 78.

Other mechanical and assembly tolerances which impact the size of the buffer region 72 include the configuration and orientation of the load tang 65 disposed on the slider body 63 which engages the ramp 60 when unloading and loading the transducer 27 and slider body 63 assembly to and from the disk surface 24. Variations in the tilt angle of the load tang 65 with respect to a plane defined by the surface of the disk 24 is accommodated, for example, by tolerance band 80. Height variations of the load tang 65 above the disk surface 24, by further example, are accommodated by an additional tolerance band 82. It is to be understood that other mechanical and assembly tolerances associated with the manufacture of data storage system components and the assembly of these components into the housing 21 also influence the size of the buffer region 72 of a conventional data storage disk 24.

An excessively large buffer region 72 negatively impacts both the data storage capacity and overall reliability of the data storage disk 24. It can be readily appreciated that allocating a larger amount of disk surface area for the buffer region 72 has the adverse effect of reducing the available disk surface area that can otherwise be dedicated for the storing of data. Further, it is generally understood by those skilled in the art that the data storage regions located near the outer diameter of the disk 24 provide for a significantly higher level of data storing and data transfer reliability, and a higher capacity for storing data, as compared to data storage regions located near the inner diameter of the disk 24. A data storage disk 24 formatted in accordance with a conventional servo writing procedure, as illustrated in FIG. 3, provides for a data zone 73 that is biased toward the inner diameter and, consequently, the relatively low reliability portions of the data storage disk 24. The necessity to allocate a sufficiently large buffer region 72 on a conventional data storage disk 24 to accommodate aggregate worst case component manufacturing and assembly tolerances, together with the conventional approach of biasing the data zone 73 toward the inner diameter of the disk 24, generally precludes the exploitation of the desirable outer diameter portions of the disk 24 for data storage purposes.

SUMMARY OF THE INVENTION

The present invention is a data zone optimization method and architecture for optimizing the orientation of the data zone on a data storage disk. The data zone is preferably biased toward the outer diameter of the disk, and is reference with respect to a data zone starting location established proximate a load/unload ramp. An optimum starting location for the data zone of a data storage disk is preferably determined by contacting the load/unload ramp with the transducer assembly, disengaging the transducer assembly from the ramp, and writing servo information indicative of the data zone starting location at a disk location proximate the ramp and transducer assembly contact point. Servo information indicative of the data zone is subsequently written to inner diameter disk locations with reference to the optimum data zone starting location on the outermost data track of the disk. The optimized data zone architecture may have either a predetermined or variable data storage capacity.

DETAILED DESCRIPTION OF THE PREFERRED EMBODIMENTS

Figure 1:
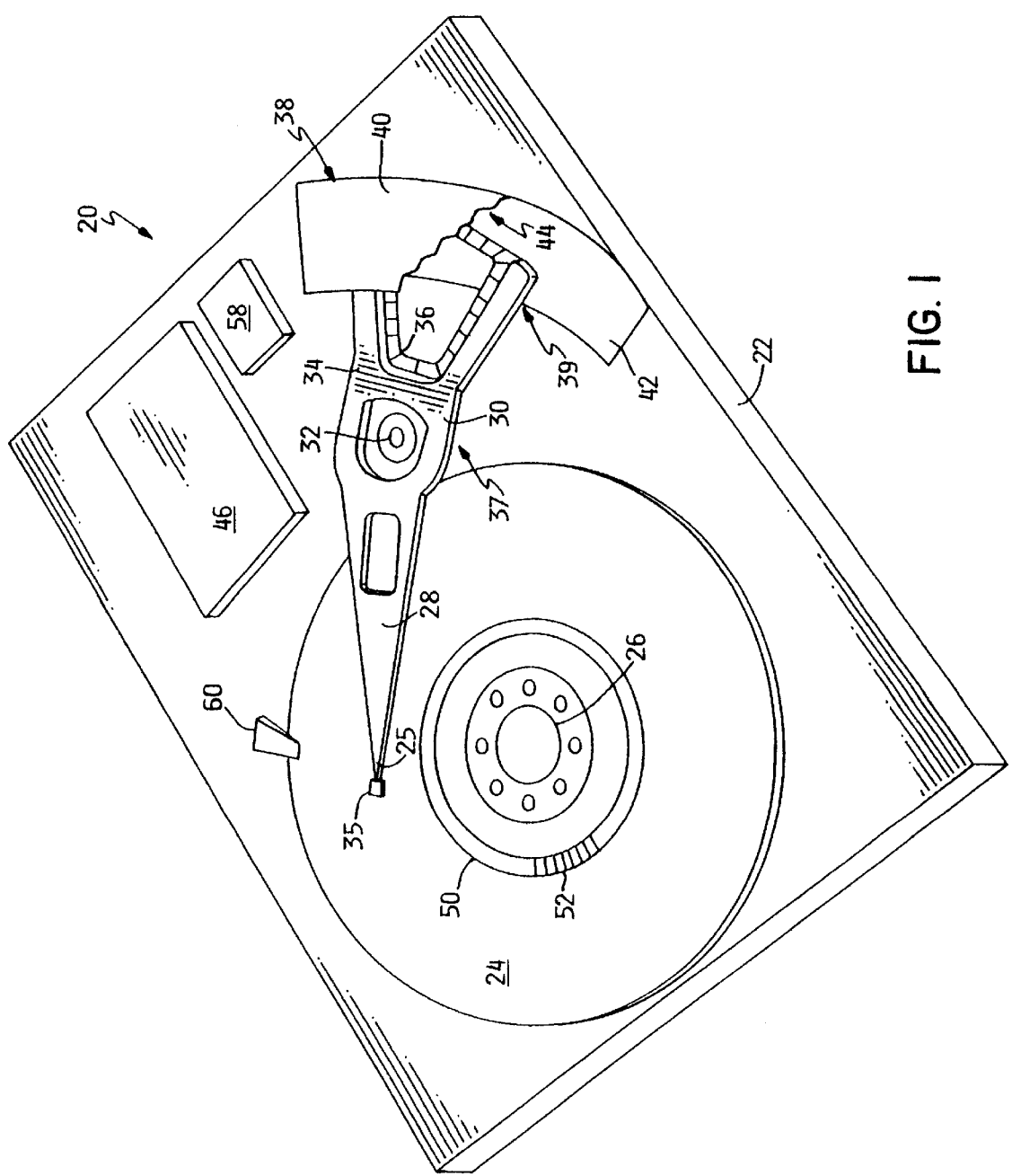
FIG. 1 is a top perspective view of a data storage system with its upper housing cover removed.
Figure 2:
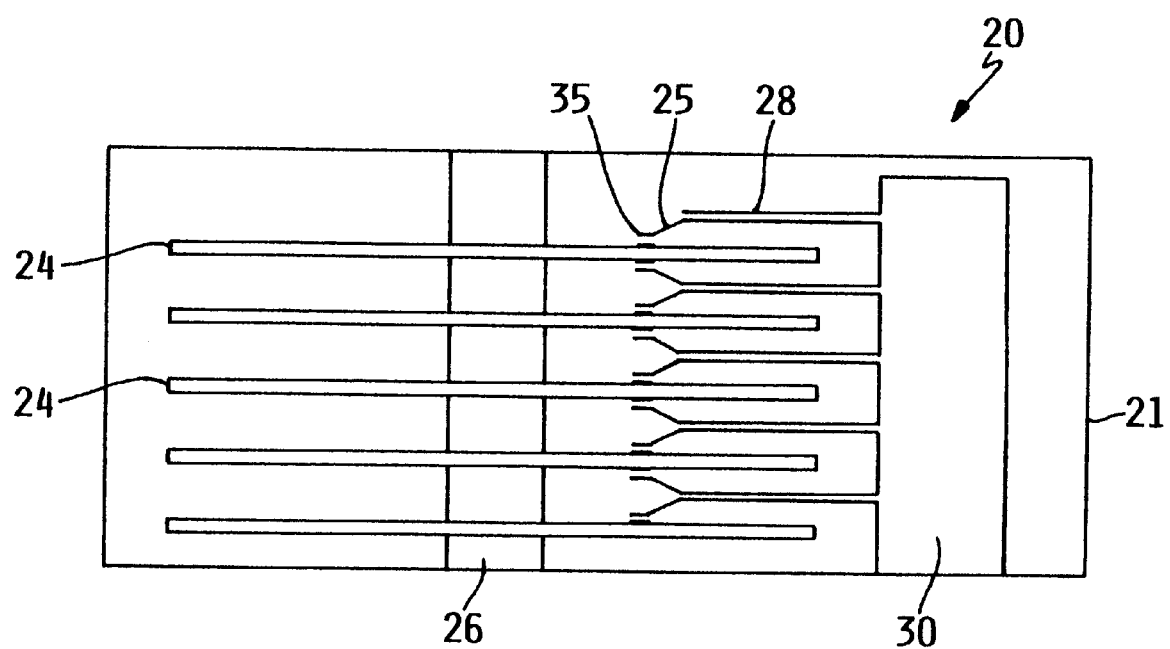
FIG. 2 is a side plan view of a data storage system comprising a plurality of data storage disks.
Figure 3:
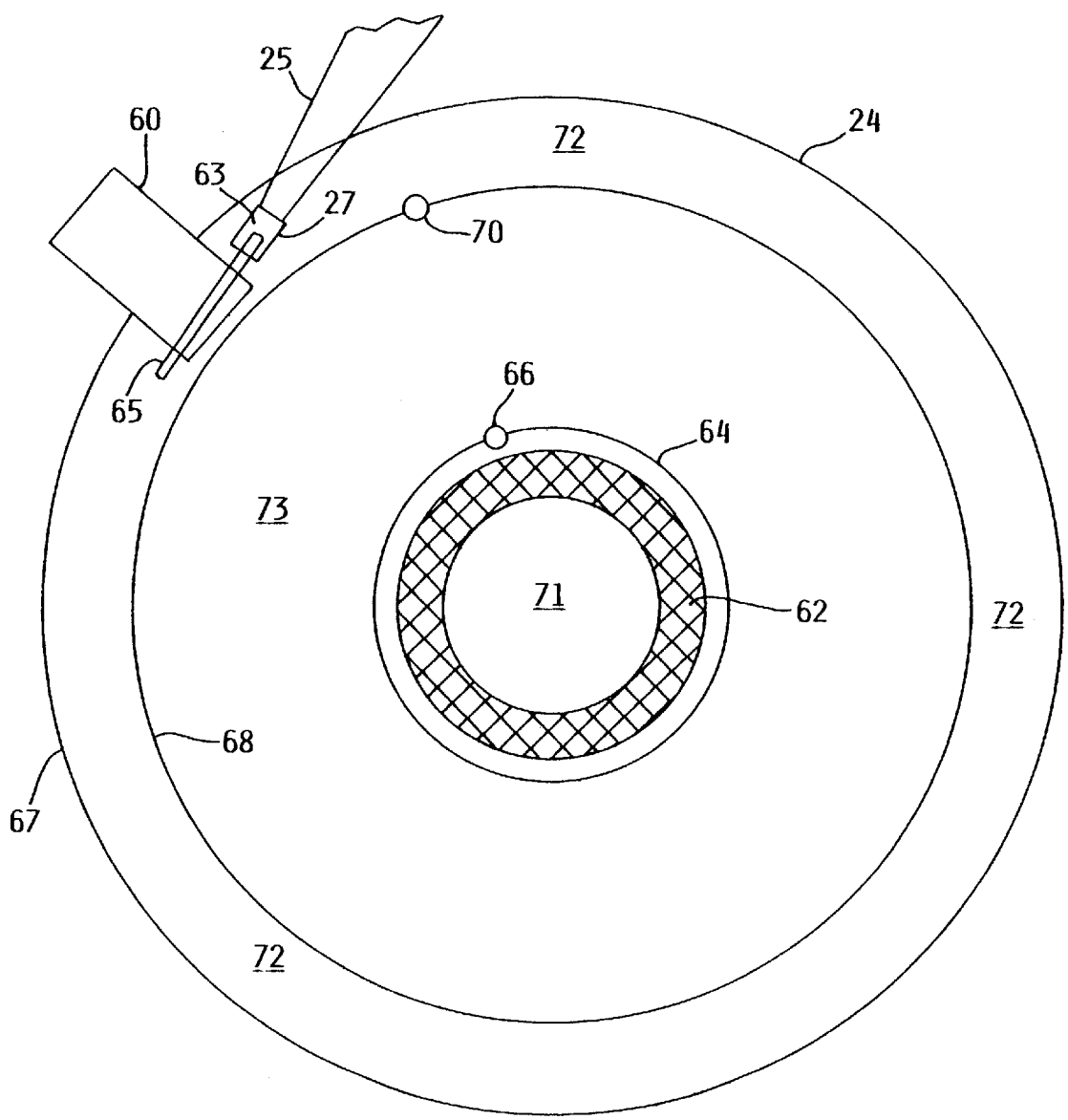
FIG. 3 is a depiction of a prior art data storage disk having a data zone biased toward the inner diameter of the disk, with a relatively large buffer region disposed between the data zone and the outer periphery of the disk.
Figure 4:
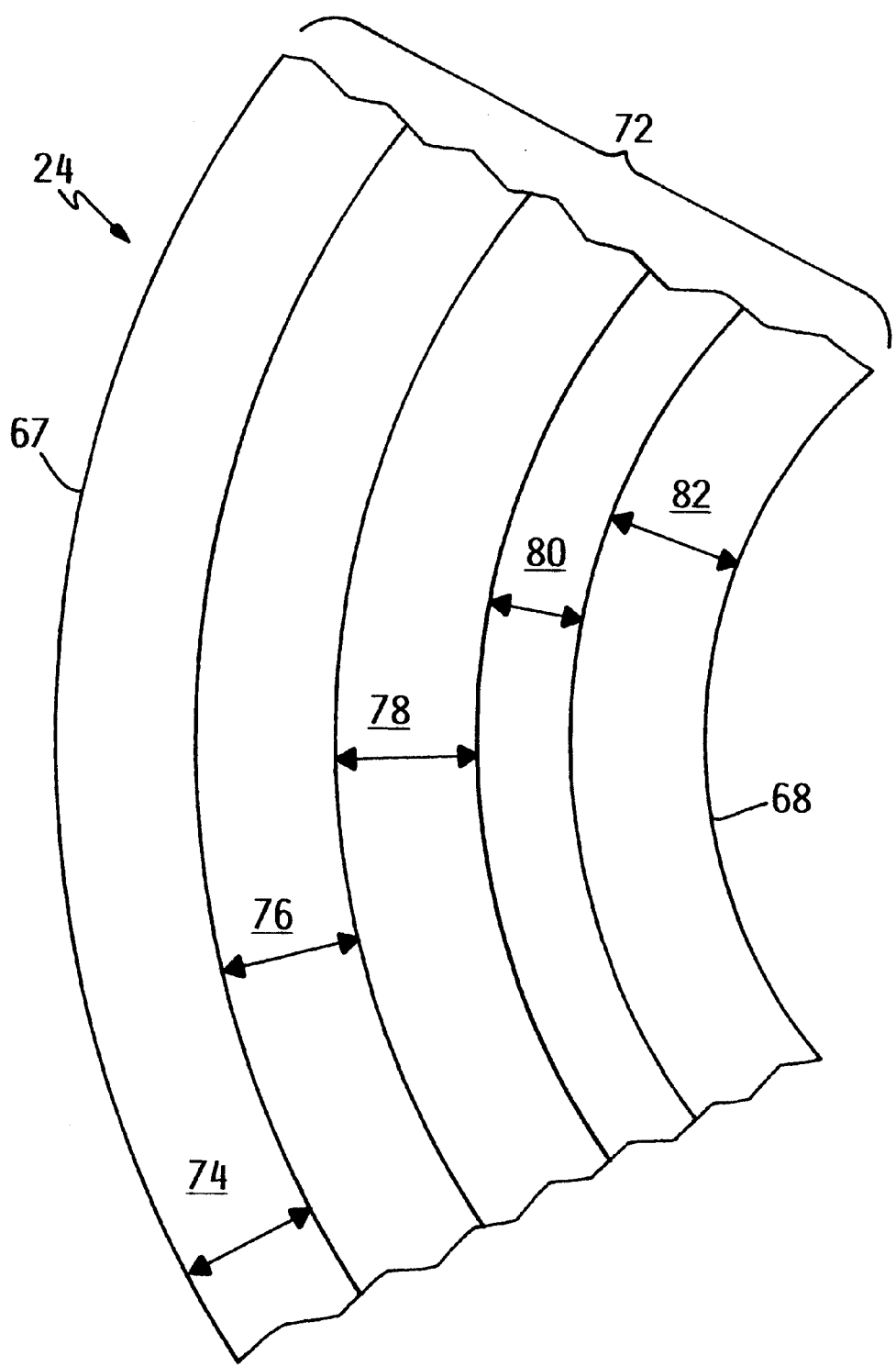
FIG. 4 is a depiction of a plurality of tolerance bands comprising the buffer region of a conventional data storage disk, with each tolerance band being representative of the disk surface area required to accommodate the maximum or worst case tolerance associated with a particular system component or assembly procedure.

Referring now to the drawings, and more particularly to FIGS. 1 and 2, there is shown a data storage system 20 with the cover removed from the base 22 of the housing 21. The data storage system 20 typically includes one or more rigid data storage disks 24 which are stacked coaxially in a tandem spaced relationship, and rotate about a spindle motor 26 at a relatively high rate of rotation. Each disk 24 is typically formatted to include a-plurality of spaced concentric tracks 50, with each track being partitioned into a series of sectors 52 which, in turn, are further divided into individual information fields. One or more of the disks 24 may alternatively be formatted to include a spiralled track configuration.

An actuator 30 typically includes a plurality of interleaved actuator arms 28, with each arm having one or more transducer 27 and slider body 63 assemblies mounted to a load beam 25 for reading and writing information to and from the data storage disks 24. The actuator 30 is usually mounted to a stationary actuator shaft 32, and rotates on the shaft to move the actuator arms 28 into and out of the stack of data storage disks 24. A coil assembly 36, mounted to a coil frame 34 of the actuator 30, generally rotates within a gap 44 defined between the upper and lower magnet assemblies 40 and 42 of a permanent magnet structure 38, causing the actuator arms 28, in turn, to sweep over the surface of the data storage disks 24. The spindle motor 26 typically comprises a poly-phase, a.c. motor or, alternatively, a d.c. motor, energized by a power supply 46 and adapted for rotating the data storage disks 24.

The coil assembly 36 and the upper and lower magnet assemblies 40 and 42 of the permanent magnet structure 38 operate in cooperation as an actuator voice coil motor 39 responsive to control signals produced by a controller 58. The actuator voice coil motor 39 produces a torquing force on the actuator coil frame 34 when control currents of varying direction and magnitude flow in the coil assembly 36 in the presence of a magnetic field produced by the permanent magnet structure 38. The torquing forces imparted on the actuator coil frame 34, in turn, cause corresponding rotational movement of the actuator arms 28 in directions dependent on the polarity of the control currents flowing in the coil assembly 36. A controller 58 preferably includes control circuity that coordinates the transfer of data to and from the data storage disks 24, and cooperates with the actuator voice coil motor 39 to move the actuator arms 28 and transducers 27 to prescribed track 50 and sector 52 locations when reading and writing data to and from the disks 24.

Figure 5:
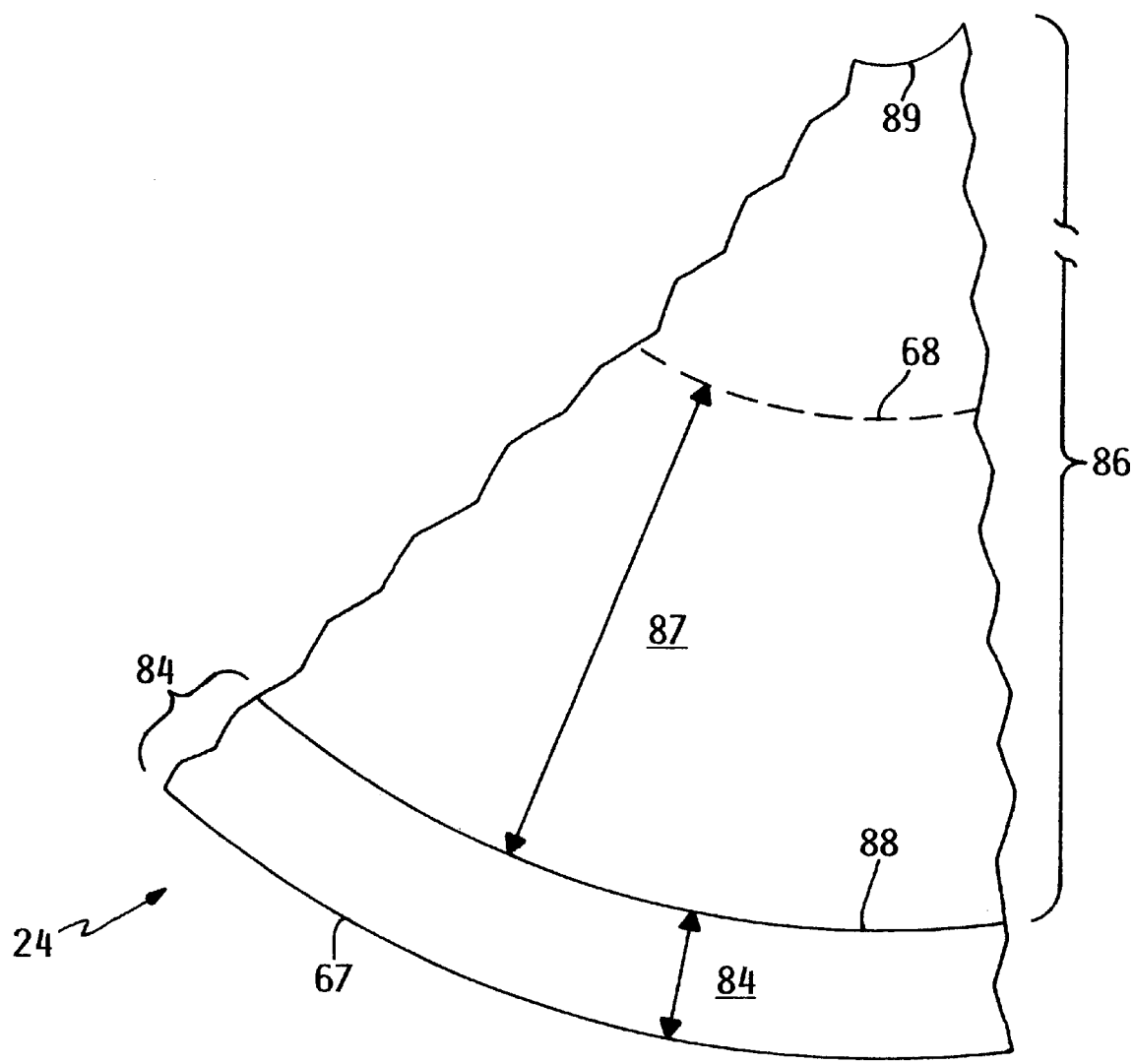
FIG. 5 is an illustration of a novel optimized data zone architecture, with the data zone being biased toward the outer diameter of the disk, and a minimal buffer region disposed between the data zone and outer periphery of the disk.

Referring now to FIG. 5, there is shown an illustration of a data storage disk 24 having an optimized data zone 86 architecture in accordance with a novel data zone optimization method. The optimized data zone 86 is preferably biased toward the outer diameter of the data storage disk 24, thereby exploiting the higher reliability portions of the disk 24 for the purpose of storing data. Further, the novel data zone optimization method and architecture generally provides for a substantial reduction in the size of the buffer region 84 provided between the optimized data zone 86 and the outer periphery 67 of the data storage disk 24. Rather than provide a buffer region 72 having a standardized size for a population of disks 24 and data storage systems 20 to accommodate component fabrication and assembly tolerance variations, data zone optimization is provided by dynamically determining a minimal buffer region 84 for individual data storage disks 24 and data storage systems 20.

In a preferred embodiment, the location of the outermost data track 88 and the size of the buffer region 84 is determined prior to writing servo information to the data storage disk 24. The novel data zone optimization method establishes an optimum outermost data track 88 for a particular data storage disk 24, taking into consideration the inherent mechanical and positional tolerances associated with the unique component configuration of a specific data storage system 20. As illustrated in FIG. 5, the buffer region 84 is generally significantly smaller in size than a standardized prior art buffer region 72, permitting the data zone 86 to be biased further toward the outer diameter of the disk 24. Also, the reduction in the size of the buffer region 84 effectively results in a concomitant increase in the amount of disk 24 surface area 87 available for storing data.

Figure 6:
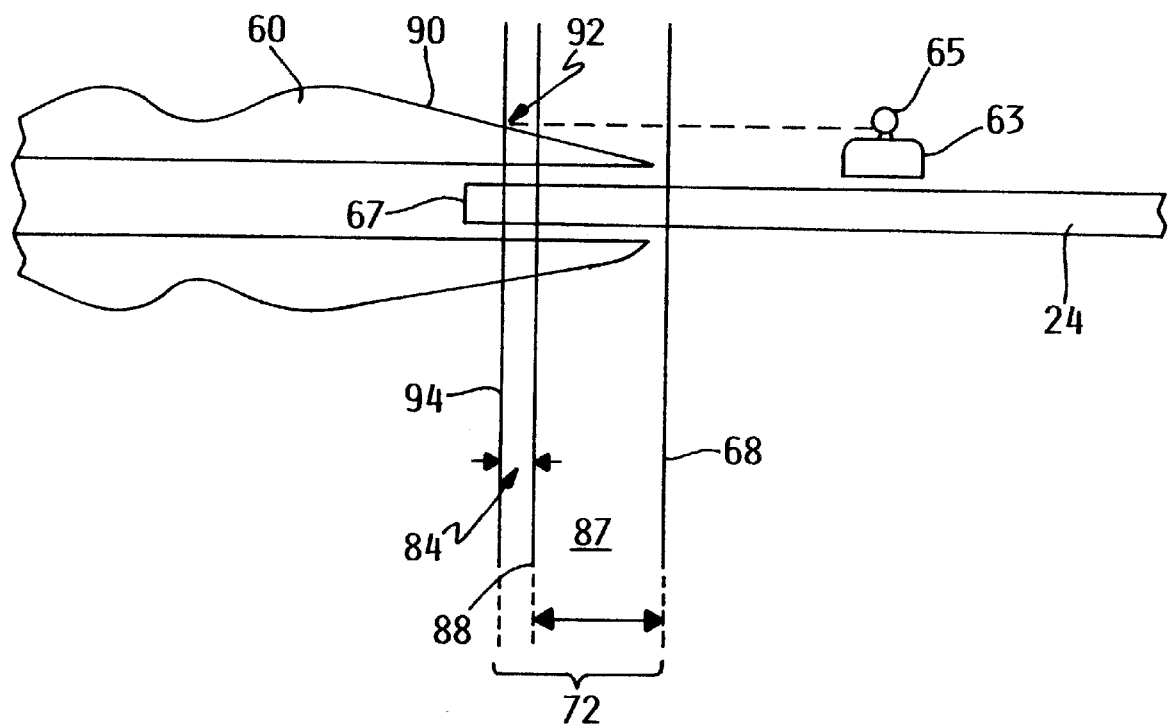
FIG. 6 is an illustration of a load/unload ramp apparatus employed to engage a transducer and slider body assembly, and a depiction of a substantially reduced buffer region realized by implementing a novel data zone optimization method and architecture.
Figure 7:
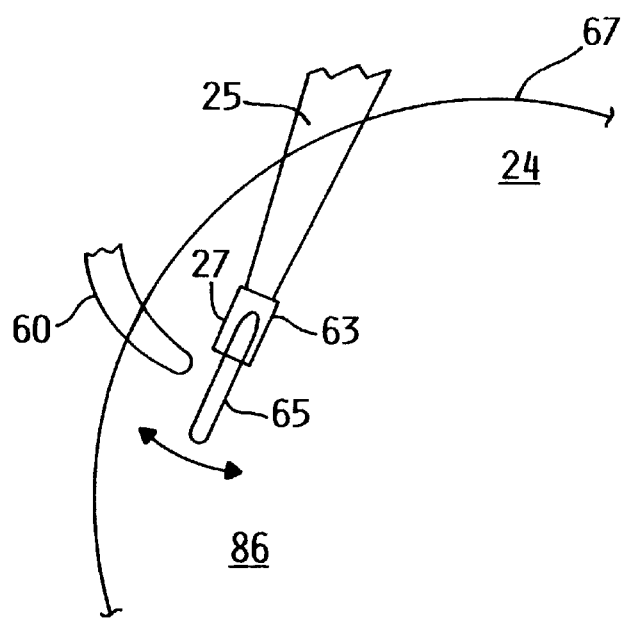
FIG. 7 is a top plan view of a load/unload ramp apparatus employed to engage a load tang extending from a slider body.

With reference to FIGS. 5–7, a method for optimizing the data zone 86 of a data storage disk 24, and the preferred architecture of the data zone 86, is disclosed. A load/unload ramp 60 is preferably coupled to the base 22 of the housing 21 and situated in proximity with the outer periphery 67 of the disk 24. In a preferred embodiment, a portion of the ramp 60 extends over a portion of the outer diameter of the disk surface 24. Alternatively, the ramp 60 may be situated adjacent the outer periphery 67 of the disk 24, with no portion of the ramp 60 extending over the disk surface 24. Further, the relative dimensions and orientation of the slider body 63 and load tang 65 affixed thereto need not conform to those illustrated in FIGS. 6–7. Accordingly, the novel data zone optimization method and architecture may be employed in load/unload data storage systems 20 having varying internal configurations and form factors.

In accordance with a novel data zone optimization method, the optimum point at which the transducer 27 and slider body 63 assembly is lifted off of the disk 24 surface and unloaded to the ramp 60 is preferably determined prior to writing servo information to the disk 24. As such, the data storage disk 24 initially does not contain servo information. In a preferred embodiment, the transducer 27 and slider body 63 assembly, initially positioned at an inner diameter location on the disk 24, is moved toward the outer periphery 67 of a data storage disk 24. The actuator 30, under the control of the actuator voice coil motor 39, or, alternatively, an external displacement motor of a servo writer apparatus, is preferably rotated toward the outer periphery 67 of the disk 24 until the load tang 65 of the transducer 27 and slider body 63 assembly contacts the ramp 60 at a load/unload point 92 on the ramp incline 90. After the load tang 65 contacts the ramp 60 at the load/unload point 92, the transducer 27 and slider body 63 assembly is moved a slight distance away from the ramp 60 sufficient to cause the load tang 65 to disengage with the incline 90 of the ramp 60. The servo writing procedure is preferably initiated at this location, with track zero of the data zone 86 and outermost data track 88 being established. Having established the data zone starting location and outermost data track 88 proximate the load/unload ramp 60, the servo writing procedure is preferably continued until the data zone 86 is defined in accordance with a desired storage capacity and track configuration specification for the data storage disk 24.

The point at which the load tang 65 contacts the ramp incline 90 at the load/unload point 92 is preferably determined by sensing an increase in the force exerted against the load tang 65 as the actuator 30 rotates into engagement with the ramp incline 90. This increase in actuator 30 force can be sensed and determined by a number of known methods. The force associated with contact between the load tang 65 and ramp 60 can, for example, be determined as a function of the amount of power consumed by the actuator voice coil motor 39. Alternatively, for a servo writing assembly employing an external displacement motor to rotate the actuator 30 during the servo writing procedure, the power consumed by the displacement motor can be sensed to determine an increase in the force associated with contact between the load tang 65 and ramp 60. It is noted that a parameter of the power consumed or delivered to the displacement motor or actuator voice coil motor 39, such as current or voltage, for example, may be measured in order to sense an actuator resistance force resulting from contact between the load tang 65 and the ramp 60.

In accordance with one data zone 86 architecture, a plurality of concentric, closely spaced data tracks 50 are formatted beginning at the outermost data track 88 proximate the ramp 60 and continuing until an innermost data track 89 is established at an inner diameter disk location. In accordance with an alternative spiraled or serpentine track configuration, a track starting location is preferably established proximate the ramp 60, and a contiguous track is formatted on the data storage disk 24 until a data zone ending location is established at an inner diameter disk location. With regard to either a concentric or spiraled data track architecture, a data zone 86 is thus defined between the data zone starting location on the outermost data track diameter 88 and the data zone ending location on the innermost data track diameter 89 illustrated in FIG. 5.

It is important to note that the data zone optimization method is performed after the various components of the data storage system 20 are installed and properly positioned within the housing 21. As discussed in detail above, each of the components employed to unload and load the transducer 27 and slider body 63 assembly to and from the disk 24 has associated with it dimensional and positional manufacturing tolerances which impact the positioning of the data zone on the disk surface, as well as the size of the buffer region between the data zone and the outer periphery 67 of the disk 24. It has been determined that a standardized buffer region 72 of a conventional disk 24 to accommodate the normal manufacturing tolerance variations associated with these components can result in a loss of approximately five to ten percent of the outer diameter disk 24 surface area that can otherwise be utilized for storing data. For example, normal manufacturing tolerance variations associated with the height of the load tang 65 with respect to the surface of the disk 24 on the order of +/−0.05 (mm) can account for a corresponding enlargement of the buffer region by approximately 0.10 (mm), which is approximately equivalent to the width of 80 to 100 data tracks 50. It is noted that tolerance variations with respect to the height of the load tang 65, ramp 60, and slider body 63, for example, impact the size of the buffer region to a greater extent than radial tolerance variations.

The illustrations provided in FIGS. 5–6 pictorially demonstrate the advantages of the novel data optimization method and architecture. The point at which the load tang 65, disposed on the slider body 63, contacts the ramp incline 90 is denoted as the load/unload point 92 on the ramp 60. The vertical line 94 associates the load/unload point 92 on the ramp incline 90 with a load/unload disk location 94 proximate to the outer periphery 67 of the disk 24. The vertical line 68 is representative of the outermost data track 68 of a conventional data storage disk 24 having a standardized buffer region 72 disposed between the outer periphery 67 of the disk 24 and the outermost data track 68. Optimization of the data zone 86 results in an outermost data track 88 that is biased toward the outer periphery 67 of the disk 24, due in part to a substantially reduced buffer region 84.

A minimal buffer region 84, illustrated as the disk surface area between the vertical lines 94 and 88, is provided to accommodate unloading and loading of the transducer 27 and slider body 63 between the ramp 60 and the outermost data track 88 of the disk 24. The disk surface area 87 between the optimized outermost data track 88 and the outermost data track 68 of a conventional data storage disk 24 represents an appreciable amount of highly reliable outer diameter disk surface area made available by implementing the novel data zone optimization scheme of the present invention.

It is noted that for a data zone architecture configured to have a fixed storage capacity, the entire data zone 86 position on the disk 24 is preferably translated toward the outermost data track 88, thereby exploiting the relatively high reliability portions of the disk surface 87 for the purpose of storing data. For a data storage system 20 employing a variable storage capacity data zone architecture, the additional outer diameter disk surface area 87 is preferably allocated for the storing of additional data. It is believed that the amount of additional outer diameter disk surface area 87 made available by employing the novel data zone optimization method is typically on the order of five to ten percent of the total storage capacity of the data zone.

Figure 8:
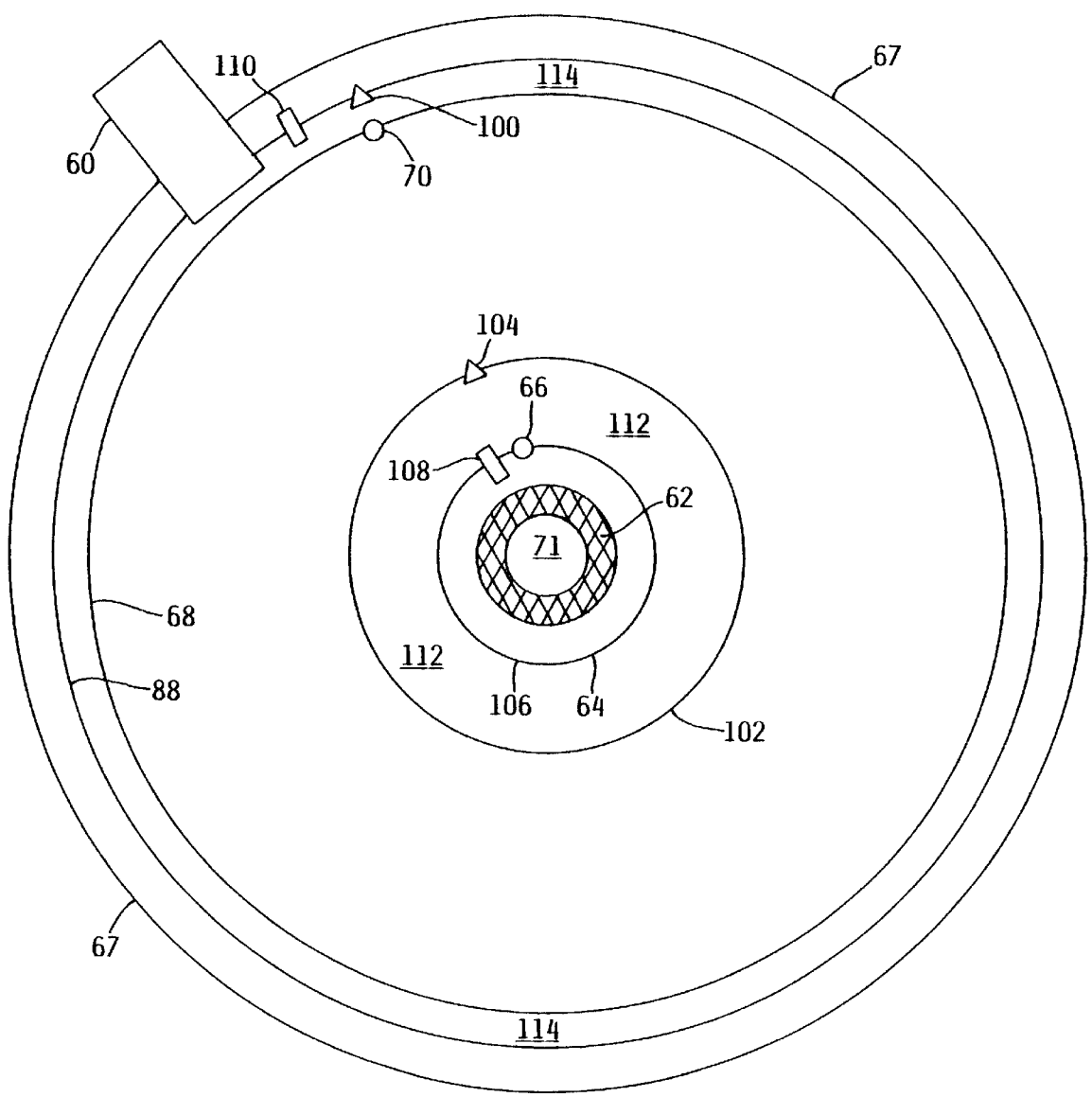
FIG. 8 is a composite depiction of the surface of a data storage disk having a data zone formatted in accordance with a conventional servo writing procedure, and fixed and variable storage capacity data zones formatted by employing a novel data zone optimization method and architecture.

A qualitative illustration of the advantages afforded by the novel data zone optimization method and architecture is provided in FIG. 8. The data zone 73 of a conventional data storage disk 24 is denoted as the data storing region between the innermost data track 64 and the outermost data track 68. As discussed previously, a traditional data zone 73 is defined by initially establishing a data zone starting location 66 at an inner diameter disk location proximate the clamp engagement 62, and writing servo information to the disk 24 to produce a series of concentric data tracks 50 until a data zone ending location 70 is established on the outermost data track 68.

In accordance with a novel data zone optimization method and architecture, the starting location 100 or track zero location for a fixed storage capacity data zone 86 is preferably established in accordance with the data zone optimization method discussed above. The procedure for writing servo information to the disk 24 to define the fixed storage capacity data zone 86 is initiated at the data zone starting location 100, and continues until a fixed storage capacity data zone is defined between the outermost data track 88 and the innermost data track 102. Optimization of the fixed storage capacity data zone results in a positional translation of the data zone 86 away from the inner diameter of the disk 24 toward the outer periphery of the disk 67. The disk surface area 114 between the outermost data tracks 68 and 88 represents the additional outer diameter disk surface area made available for the storage of data by employing the novel data zone optimization method.

It may be desirable to format a data storage disk 24 to include a variable storage capacity data zone. In accordance with a variable storage capacity data zone architecture, the data zone starting location 110 is preferably established by performing the data optimization method discussed above. Servo information is then written with reference to the data zone starting location 110 until an inner diameter data zone ending location 108 is established. It is noted that an inner diameter actuator stop is typically employed to prevent the actuator 30 from rotating the transducer 27 and slider body 63 assembly beyond a specified inner diameter location. The location at which the actuator 30 engages the actuator stop generally determines the location of the innermost data track 64 or 106. To maximize the size of a variable storage capacity data zone, the servo writing procedure may be continued until the inner diameter actuator stop is reached.

It will, of course, be understood that various modifications and additions can be made to the embodiments discussed hereinabove without departing from the scope or spirit of the present invention. For example, the configuration of the load/unload ramp 60 and slider body 63/load tang 65 assembly may be different than that illustrated in FIGS. 6 and 7. Further, an optimized data zone may comprise a single contiguous data zone or a plurality of individual data zones. Accordingly, the scope of the present invention should not be limited by the particular embodiments discussed above, but should be defined only by the claims set forth below and equivalents of the disclosed embodiments.

What is claimed is:

1. A method of optimizing the location of a data zone on a data storage disk of a data storage system, the data storage system including a transducer assembly mounted to an actuator for transferring information to and from the disk, and a ramp disposed proximate the outer periphery of the disk for unloading and loading the transducer assembly to and from the disk, the method comprising the steps of:

registering the transducer assembly at a first location of the disk proximate the ramp;

writing servo information indicative of a starting location of the data zone to the disk at the first disk location;

moving the transducer assembly from the first disk location toward an inner diameter location of the disk; and writing servo information indicative of the data zone to the disk between the first disk location and the inner diameter location of the disk with reference to the first disk location;

wherein writing servo information indicative of the starting location of the data zone at the first disk location biases the data zone toward the outer periphery of the data storage disk by registering the starting location of the data zone proximate the ramp.

2. A method as claimed in claim 1, including the further step of providing the data storage disk having no servo information written to the disk.

3. A method as claimed in claim 1, wherein the step of moving the transducer assembly includes the step of moving the transducer assembly with a displacement motor, the displacement motor being external to the data storage system.

4. A method as claimed in claim 1, wherein the step of registering the transducer assembly includes the steps of:

moving the transducer assembly from the inner diameter location of the disk toward the outer periphery of the disk; and contacting the ramp with the transducer assembly.

5. A method as claimed in claim 1, wherein the step of registering the transducer assembly includes the steps of:

contacting the ramp with the transducer assembly; and moving the transducer assembly out of contact with the ramp to the first disk location proximate the ramp.

6. A method as claimed in claim 1, wherein the step of registering the transducer assembly at the first disk location includes the step of providing a buffer region on the disk between the ramp and the first disk location.

7. A method as claimed in claim 1, wherein the step of registering the transducer assembly includes the steps of:

sensing a force associated with contact between the transducer assembly and the ramp; and moving the transducer assembly out of contact with the ramp to the first disk location in response to the contact force.

8. A method as claimed in claim 7, wherein the step of sensing the contact force includes the step of sensing a parameter of power consumed by the actuator.

9. A method as claimed in claim 7, wherein the step of sensing the contact force includes the step of sensing a parameter of power consumed by a displacement motor coupled to the actuator, the displacement motor being external to the data storage system.

10. A method as claimed in claim 1, wherein the step of writing servo information indicative of the data zone includes the step of writing servo information indicative of a data zone having a predetermined data storage capacity.

11. A method as claimed in claim 1, wherein the step of writing servo information indicative of the data zone includes the step of writing servo information indicative of a data zone having a variable data storage capacity.

12. A method of optimizing the location of the data zone on a data storage disk of a data storage system, the data storage system including a transducer assembly mounted to an actuator for transferring information to and from the data disk, and a ramp disposed proximate the outer periphery of the disk for unloading and loading the transducer assembly to and from the data storage disk, the method comprising the steps of:

providing the data storage disk having no servo information written to the disk;

moving the transducer assembly from engagement with the ramp to a first location on the disk proximate the ramp;

writing servo information indicative of a starting location of the data zone at the first disk location;

moving the transducer assembly from the first disk location toward an inner diameter location of the disk; and writing servo information indicative of the data zone to the disk between the first disk location and the inner diameter location of the disk with reference to the first disk location;

wherein writing servo information indicative of the starting location of the data zone at the first disk location biases the data zone toward the outer periphery of the data storage disk.

13. A method as claimed in claim 12, wherein the step of moving the transducer assembly from engagement with the ramp includes the step of providing a buffer region on the disk between the ramp and the first disk location.

14. A method as claimed in claim 12, including the further steps of:

sensing the force associated with disengagement between the transducer assembly and the ramp; and writing servo information indicative of the starting location of the data zone at the first disk location in response to the disengagement force.

15. A method as claimed in claim 14, wherein the step of sending the disengagement force includes the step of sensing a parameter of power consumed by the actuator.

16. A method as claimed in claim 14, wherein the step of sensing the disengagement force includes the step of sensing a parameter of power consumed by a displacement motor coupled to the actuator, the displacement motor being external to the data storage system.

17. A method as claimed in claim 12, wherein the step of writing servo information indicative of the data zone includes the step of writing servo information indicative of a data zone having a variable data storage capacity.

18. A system for storing data comprising:

a housing base;

a data storage disk having an outer diameter and an inner diameter;

a spindle motor coupled to the housing base and adapted for mounting the data storage disk;

an actuator coupled to the housing base;

a transducer assembly, including a transducer, mounted to the actuator; and a ramp, mounted to the housing base proximate the outer diameter of the data storage disk, adapted for unloading and loading the transducer assembly to and from a surface of the data storage disk, the data storage disk having a data zone architecture comprising:

a starting location of the data zone located proximate the ramp;

an ending location of the data zone located toward the inner diameter of the disk, the ending data zone location being referenced with respect to the starting data zone location; and a data zone defined between the starting and ending data zone locations;

wherein the starting location being located proximate the ramp biases the data zone toward the outer diameter of the disk.

19. A system as claimed in claim 18, wherein the data zone architecture further comprises a buffer region disposed between the ramp and the starting location of the data zone.

20. A system as claimed in claim 18, wherein the data storage capacity of the data zone is a predetermined data storage capacity.

21. A system as claimed in claim 18, wherein the data storage capacity of the data zone is a variable data storage capacity.

* * * * *